May 8, 1956            A. WERFELI            2,744,445
PHOTOGRAPHIC AND PROJECTION OBJECTIVE OF THE PETZVAL TYPE
Filed Oct. 6, 1954
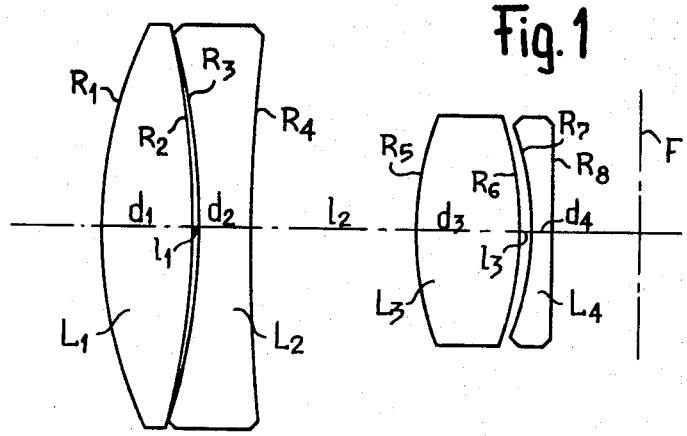
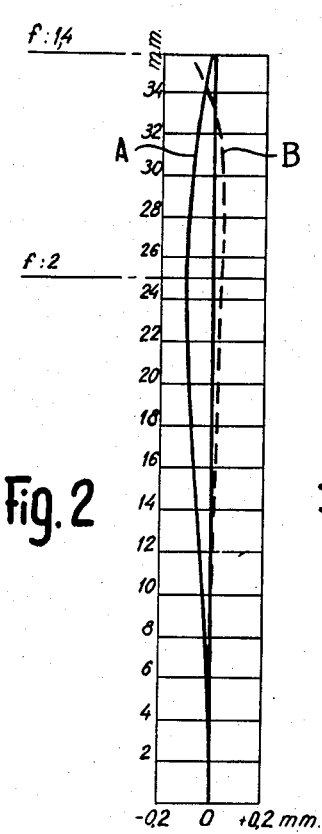
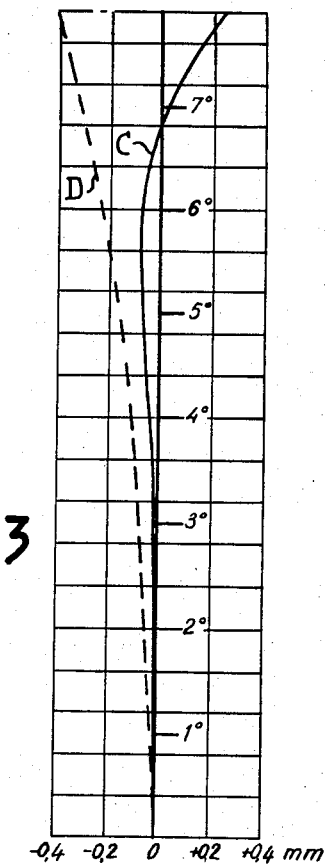
INVENTOR
Arnold Werfeli.
ATTORNEY

United States Patent Office 2,744,445
Patented May 8, 1956

2,744,445

PHOTOGRAPHIC AND PROJECTION OBJECTIVE OF THE PETZVAL TYPE

Arnold Werfeli, Yverdon, Switzerland, assignor to Paillard S. A., Sainte-Croix, Switzerland, a corporation of Switzerland Application October 6, 1954, Serial No. 460,650

Claims priority, application Switzerland November 4, 1953

3 Claims. (Cl. 88—57)

The present invention has for its subject a photographic objective of the Petzval type.

Objectives of this type are composed of two convergent achromatic groups each formed by two lenses. In the original Petzval objective the two lenses forming the front group were cemented together, whereas the two lenses forming the rear group were separated by an air space. The simplicity and consequently the low cost price of these objectives has increased their large employment, especially for cinematographic projection. However, objectives of the Petzval type actually known have the disadvantage of having a generally strong Petzval sum, which limits their use in small fields, when it is desired to maintain the average curvature of field and astigmatism within the limits necessary for obtaining a satisfactory clearness within the edges of the image. The relative opening of these objectives covering a field of ±8° does not actually exceed f:1.6.

The invention has for its object to remedy the disadvantages referred to and has for its subject a photographic objective comprising two convergent achromatic groups each formed by two lenses, the latter being separated by an air gap, the first of said groups being the front group, the second the rear group. It is distinguished from known objectives of the same type by the fact that the second radius of the first lens of the front group and the first radius of the second lens of the same group are each of an absolute value at least 1.3 times greater than the first radius of the said first lens, the latter being greater than 80% of the total focal distance of the objective, the second radius of the first lens of the rear group being of an absolute value greater than the first radius of the same lens, the thickness of the latter having a value comprised between 10% and 25% of the value of the total focal length of the objective.

An objective according to the invention and some of its characteristics are shown diagrammatically and by way of example in the accompanying drawings, wherein:

Fig. 1 shows the objective.

Fig. 2 shows the curves of aberration sphericity and of the condition of the sine.

Fig. 3 shows the curves of the sagittal and tangential field.

As shown in Fig. 1, the objective according to the invention is composed of two convergent achromatic groups. Each of these groups is formed by two lenses. The group located at the side of the object is called the front group, the group located at the side of the film F being called the rear group. The front group is formed by two lenses $L_1$ and $L_2$ separated by an air space $l_1$, the thickness of the lenses being respectively $d_1$ and $d_2$. The radii of curvature of the surfaces of the lenses $L_1$ and $L_2$ are indicated by $R_1$, $R_2$ and $R_3$, $R_4$ respectively. A sign + or — respectively in front of a radius indicates whether this refers to a convex or concave surface relatively to the object. Thus the radii $R_1$ and $R_4$ are positive, the radii $R_2$ and $R_3$ being negative. The rear group is located at a distance $l_2$ from the front group and comprises two lenses $L_3$ and $L_4$ separated by an air gap $l_3$ and having thicknesses $d_3$, $d_4$ respectively. The radii of curvature of the surfaces of the lenses $L_3$ and $L_4$ are indicated by $R_5$, $R_6$ and $R_7$, $R_8$ respectively.

The following table gives the numerical values of an objective according to the invention for a total focal length f=100 mm. and a relative opening f:1.4; n and V indicating respectively the index of refraction of the ray D of the spectrum, and the constringency of the types of glass used.

| L | R in mm. | d, l in mm. | $n_D$ | V |
|---|---|---|---|---|
| $L_1$ | $R_1=+\ 89.8$ | $d_1=17.5$ | $n_1=1.67741$ | $V_1=55.6$ |
|  | $R_2=-162.2$ | $l_1=\ 1.15$ |  |  |
| $L_2$ | $R_3=-131.55$ | $d_2=10$ | $n_2=1.68873$ | $V_2=31.2$ |
|  | $R_4=+365.7$ | $l_2=73.8$ |  |  |
| $L_3$ | $R_5=+\ 57.85$ | $d_3=12.5$ | $n_3=1.67741$ | $V_3=55.6$ |
|  | $R_6=-\ 70.3$ | $l_3=\ 1.75$ |  |  |
| $L_4$ | $R_7=-\ 59.95$ | $d_4=\ 2.5$ | $n_4=1.74174$ | $V_4=27.5$ |
|  | $R_8=\infty$ |  |  |  |

As will be seen from the above table the conditions set by the features of the invention, that is to say $$-R_2 > 1.3\ R_1$$
$$-R_3 > 1.3\ R_1$$
$$R_1 > 0.8\ f$$
$$-R_6 > R_5$$
$$0.25\ f > d_3 > 0.10\ f$$

are satisfied.

On the other hand the above objective has the following features:

$$n_4 > 1.72$$
$$n_4 - n_3 > 0.05$$

By a simple calculation it is possible to show that the Petzval sum of the objective according to the example is substantially smaller than that of known objectives of the same type. This permits of reducing the average curvature of field and astigmatism and of obtaining a better clearness of the image for a given field. In Fig. 3 the curves C and D represent the curvatures of field tangentially and sagittally respectively. It will be seen that the average curvature of field does not exceed 0.17% of the focal length in the whole field of ±8°. On the other hand astigmatism remains below 0.65% of f.

The aberration of sphericity is also corrected remarkably well. In Fig. 2 the curves A and B represent respectively aberration of sphericity and the condition of the sines. It will be seen that for a relative opening of the objective of f:1.4 the zonal aberration of sphericity does not exceed 0.1% of the focal length.

It will be understood that the objective shown in the example may be modified whilst remaining within the scope of the invention. For example, in a modification, the rear group of the objective above described may be replaced by another group formed by lenses having the following characteristics:

| L | R in mm. | d, l in mm. | $n_D$ | V |
|---|---|---|---|---|
| $L_3$ | $R_5=+61.75$ | $l_2=67$ |  |  |
|  | $R_6=-67.9$ | $d_3=20$ | $n_3=1.67741$ | $V_3=55.6$ |
|  | $R_7=-56.8$ | $l_3=\ 2$ |  |  |
| $L_4$ | $R_8=\infty$ | $d_4=\ 4.3$ | $n_4=1.74174$ | $V_4=27.5$ |

I claim:
1. A photographic objective comprising two converging achromatic groups, each of said groups comprising two lenses, the lenses of each group being separated by an air space at least 1% of the total focal length of the objective, and each group being separated by an air space not greater than 75%, and not less than 60% of the total focal length of the objective, the first of said groups being the front group and the second of said groups being the rear group, each lens of said groups having a first and a second radius of curvature, the second radius of the first lens of the front group having an absolute value between approximately 1.5 and 1.7 times as great as the total focal length of the objective, the first radius of the first lens of the front group being greater than 80% of the total focal length of the objective, the first radius of the second lens of the front group having an absolute value between approximately 1.3 and 1.5 times as great as the total focal length of the objective, the second radius of the first lens of the front group and the first radius of the second lens of the front group having an absolute value between approximately 1.3 and 2.0 times as great as the first radius of the first lens of the front group, the second radius of the second lens of the front group having an absolute value between approximately 3.0 and 4.5 times as great as the first radius of the first lens of the front group and between approximately 3.0 and 4.5 times as great as the total focal length of the objective, the second radius of the first lens of the rear group having and absolute value between approximately 1.08 and 1.30 times as great as its first radius, the first radius of the first lens of the rear group having an absolute value of between approximately 0.5 and 0.7 times as great as the total focal length of the objective, the first radius of the second lens of the rear group having an absolute value between approximately 0.5 and 0.7 times as great as the total focal length of the objective, the second radius of the second lens of the rear group having an infinite value, the respective thicknesses of the first lens of the front group, of the second lens of the front group, and of the first lens of the rear group having values of between 10% and 25% of the total focal length of the objective, the thickness of the second lens of the rear group having a value between 2% and 5% of the total focal length of the objective, the index of refraction of the second lens of the rear group being greater than 1.72 and greater than the respective indices of refraction of the first and second lenses of the front group and of the first lens of the rear group, the second lens of the front group and the second lens of the rear group having Abbé numbers greater than 25 and less than 56, and the first lens of the front group and the first lens of the second group having Abbé numbers greater than the Abbé numbers of their respective second lenses and less than 60.

2. A photographic objective having the following numerical data,

[Focal length f=100 mm. Relative opening f: 1.4.]

| Lens No. | Radii of the lens surfaces in mm. | Thicknesses and axial separations in mm. | Index of Refraction | Abbé No. |
|---|---|---|---|---|
| 1 | $R_1=+\ 89.8$ | $d_1=17.5$ | 1.67741 | 55.6 |
|   | $R_2=-162.2$ | $l_1=\ 1.15$ |  |  |
| 2 | $R_3=-131.55$ | $d_2=10$ | 1.68873 | 31.2 |
|   | $R_4=+365.7$ | $l_2=73.8$ |  |  |
| 3 | $R_5=+\ 57.85$ | $d_3=12.5$ | 1.67741 | 55.6 |
|   | $R_6=-\ 70.3$ | $l_3=\ 1.75$ |  |  |
| 4 | $R_7=-\ 59.95$ | $d_4=\ 2.5$ | 1.74174 | 27.5 |
|   | $R_8=\infty$ infinity |  |  |  |

$d_1$, $d_2$, $d_3$ and $d_4$ denoting the axial thicknesses of lens elements, and $l_1$, $l_2$ and $l_3$ denoting the axial separation of lens elements.

3. A photographic objective having the following numerical data:

| Lens No. | Radii of the lens surfaces in mm. | Thicknesses and axial separations in mm. | Index of Refraction | Abbé No. |
|---|---|---|---|---|
| 1 | $R_1=+\ 89.8$ | $d_1=17.5$ | 1.67741 | 55.6 |
|   | $R_2=-162.2$ | $l_1=\ 1.15$ |  |  |
| 2 | $R_3=-131.55$ | $d_2=10$ | 1.68873 | 31.2 |
|   | $R_4=+365.7$ | $l_2=67$ |  |  |
| 3 | $R_5=+\ 61.75$ | $d_3=20$ | 1.67741 | 55.6 |
|   | $R_6=-\ 67.9$ | $l_3=2$ |  |  |
| 4 | $R_7=-\ 56.8$ | $d_4=\ 4.3$ | 1.74174 | 27.5 |
|   | $R_8=\infty$ infinity |  |  |  |

$d_1$, $d_2$, $d_3$ and $d_4$ denoting the axial thicknesses of lens elements, and $l_1$, $l_2$ and $l_3$ denoting the axial separation of lens elements.

References Cited in the file of this patent

UNITED STATES PATENTS

| 1,479,251 | Repp | Jan. 1, 1924 |
| 1,484,853 | Warmisham | Feb. 26, 1924 |
| 1,843,519 | Richter | Feb. 2, 1932 |

FOREIGN PATENTS

| 465,010 | Germany | Sept. 3, 1928 |
| 583,297 | Great Britain | Dec. 13, 1946 |